UNITED STATES PATENT OFFICE.

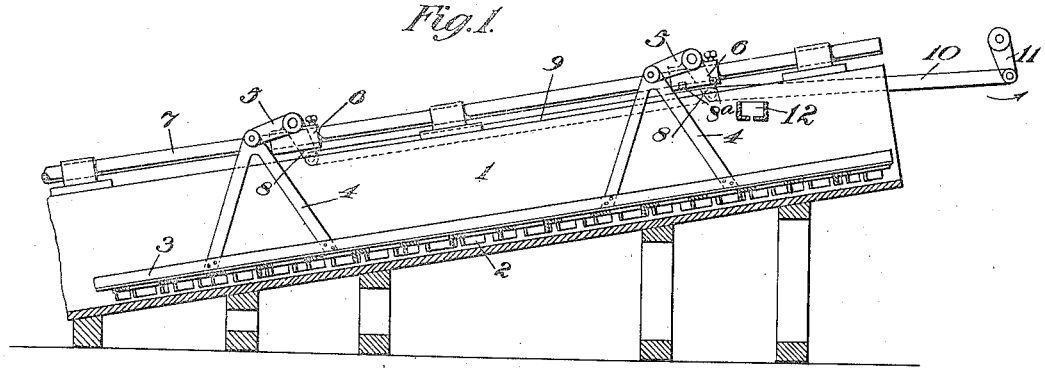
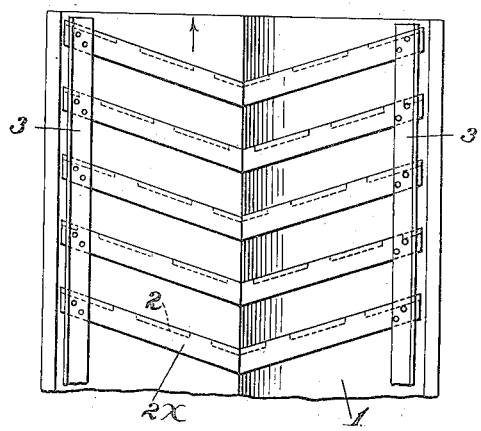
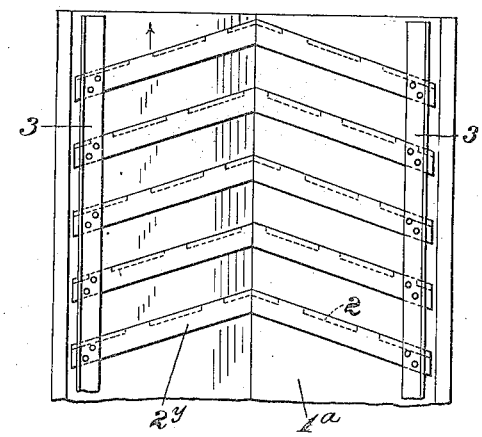
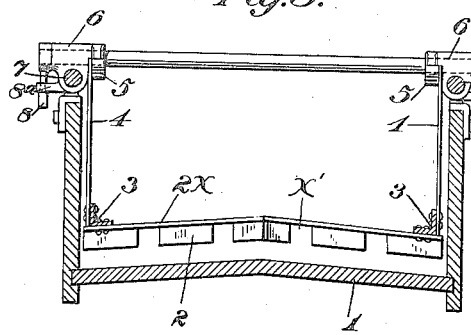
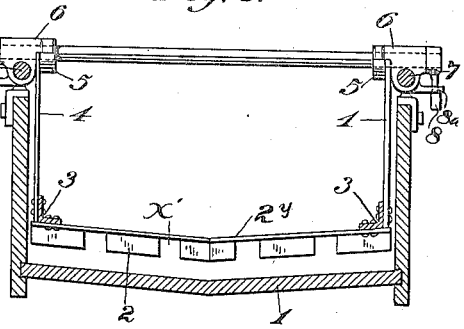

HUGH B. LOWDEN, OF DENVER, COLORADO, ASSIGNOR TO COLORADO IRON WORKS COMPANY, OF DENVER, COLORADO, A CORPORATION OF MAINE.

MEANS FOR SIMULTANEOUSLY CONVEYING AND DEWATERING MATERIAL.

1,181,022.     Specification of Letters Patent.     Patented Apr. 25, 1916.

Original application filed October 25, 1913, Serial No. 797,254. Divided and this application filed February 26, 1914, Serial No. 821,329. Renewed March 20, 1916. Serial No. 85,497.

*To all whom it may concern:*

Be it known that I, HUGH B. LOWDEN, citizen of the United States, residing at Denver, Colorado, have invented certain new and useful Improvements in Means for Simultaneously Conveying and Dewatering Material, of which the following is a specification.

My present invention relates to improved means for moving or conveying and simultaneously washing and dewatering wet or moist material, such as sand for example, and has for its objects among others to provide an extremely simple and efficient form of apparatus which, in addition to the forward transportation of the material, will effect a plowing or rabbling action thereof.

The invention includes the novel features of construction and arrangement and combination of parts hereinafter described and particularly defined by the appended claims.

An embodiment of the invention is illustrated in the accompanying drawing in which—

Figure 1 is a longitudinal sectional elevation; Fig. 2 is a plan view of a portion of the trough and blades shown in Fig. 1; Fig. 3 is a transverse sectional view of the same; Fig. 4 is a view similar to Fig. 2, but showing reverse inclination of the rake blades; and Fig. 5 is a transverse section through Fig. 4.

Referring by reference characters to this drawing, the numeral 1 designates a conveyer trough which may be of any desired form, and 2 the conveyer blades conforming to and adapted to be operated within the trough. These blades are carried suitably spaced, by a longitudinal bar or bars 3 and are designed to be operated by mechanism which will impart a reciprocating or to and fro movement to the blades in two different planes.

I have illustrated as a means which may advantageously be used for imparting such movement one form of the operating mechanism which is included in an application filed by me in the United States Patent Office on the 25th day of October, 1913, Serial No. 797,254, and of which application the present case is a division. In this form the rake blades or flights 2 are attached to cross bars $2^x$ which are attached at their ends to the longitudinal bars 3. These, in turn, are suspended by uprights or hangers 4 from the ends of arms 5 of bell cranks which are journaled in bearings 6 carried by a slidable bar or rod 7. The other arms 8 of these bell cranks are connected by link 9 and by pitman 10 with a prime mover as indicated by crank 11. Stops, indicated at $8^a$, limit the rocking movement of the bell cranks, and it will be understood that as pitman 9 moves in one direction, say to the right, Fig. 1, the bell cranks are rocked to lower the rakes until arrested by the stops when further movement of the pitman moves the rake or conveyer to the right. Reverse movement of the pitman first rocks the bell cranks to raise the rake and then moves the same to the left while maintaining it elevated.

In some cases the weight of the parts suspended from the bell cranks might be so great as to prevent the raising action, the friction of the slider on its support not being sufficient for this purpose. In this event I may provide some counterbalancing means.

In order that the apparatus may effect both a conveying or raking action and also a plowing effect to dry or partially dry the material, I form the rakes of oblique and interrupted rabbles so that a plowing action is secured in addition to the forward transportation of the material. These scrapers or rabbles are so disposed with relation to each other that the material not advanced by one transverse set of rabbles, owing to the spaces between the blades, will be engaged and moved forward by the next set. That is to say, the rabbles are not placed in rows longitudinally but are staggered so that the longitudinal ridges left by the interruptions are not continuous but broken alternately, thus permitting drainage. One embodiment of this is shown in Figs. 1, 2 and 3, in which the bottom of the inclined trough is not flat but slopes downwardly from the center to the sides, the rakes $2^x$ being formed as in Figs. 2 and 3, so as to force the sand up toward the center of the trough and allow the excess moisture to drain downward to and along the sides of the trough, it being understood that the plowing or scraping action takes place when the rake is moving in the direction of the arrow. The interruptions in the scrapers shown at x' increase the plowing action and promote good drainage. An obvious variation would be a trough having the bottom downwardly inclined toward the center, in which modification the inclination of the rabbles would be the reverse of that shown, the sand would be delivered at the two sides of the discharge end and the drainage would be backward along the center of the trough, as shown at 1ª and 2ʸ in Figs. 4 and 5.

The material to be operated upon may be fed to the trough in any suitable manner not necessary to be described herein.

For the purpose of washing the sand, water or other liquid may be applied at a point more or less removed from the discharge end. Means for this are indicated at 12 in Fig. 1.

It will be understood that by the term "trough" I refer not only to a device open at both ends such as shown in Fig. 1, but include also other forms such, for example, as a trough or receptacle closed at its lower end.

I claim as my invention:—

1. In combination a separating trough having a longitudinally and transversely inclined bottom and a rake with means for operating it longitudinally of the trough, said rake being formed of a series of transversely oblique interrupted rabbles, said rabbles being so arranged that they cause the travel of the material up the longitudinal incline by their motion in that direction, and cause this travel to be along the upper portion of the transverse incline by their obliquity.

2. In combination a separating trough having a longitudinally and transversely inclined bottom and a rake with means for operating it longitudinally of the trough, said rake being formed of a series of transversely oblique rabbles, said rabbles being so arranged that they cause the travel of the material up the longitudinal incline by their motion in that direction, and cause this travel to be along the upper portion of the transverse incline by their obliquity.

3. In combination a stationary separating trough having a longitudinally and transversely inclined bottom and reciprocating means for effecting longitudinal movement of solids along the more elevated portion of the bottom.

4. In combination an inclined stationary separating trough having a bottom inclining from the center toward the side edges and reciprocating means for effecting longitudinal movement of the solids along the elevated portion or portions of said bottom.

5. In combination a separating trough having a longitudinally and transversely inclined bottom, a series of interrupted oblique rabbles for operating within the trough, and means for reciprocating said rabbles longitudinally of the trough in closed paths, said means being adapted to establish a straight line movement in the lower portion of said paths.

In testimony whereof, I affix my signature in presence of two witnesses.

HUGH B. LOWDEN.

Witnesses:
JAMES M. SPEAR,
BENNETT S. JONES.